May 12, 1959 L. H. CASTONGUAY ET AL 2,886,059
VALVE
Filed Feb. 25, 1957

LEON H. CASTONGUAY
WILLIAM H. ST. CYR, SR.
INVENTORS

BY Norman S. Blodgett
ATTORNEY

2,886,059

VALVE

Leon H. Castonguay, East Brookfield, and William H. St. Cyr, Sr., Gilbertville, Mass., assignors of twenty-five percent to Norman S. Blodgett, Westboro, Mass.

Application February 25, 1957, Serial No. 642,084

6 Claims. (Cl. 137—493)

This invention relates to a valve and more specifically to a restriction for use in a fluid system for controlling flow.

There are many situations encountered in the design of hydraulic circuits when it is desired to provide for a certain rate of flow through a conduit in one direction and an entirely different rate of flow in the other direction. In the past, this problem has been solved by the use of two flow control valves in series, each consisting of a ball check and a needle; with flow in one direction, the ball check of one valve is open and the needle is bypassed, while the ball check of the other valve is closed and the fluid can pass only by the needle. When flow is in the other direction, the conditions of the elements are reversed and the other needle is operative to control flow. One of the difficulties experienced with this prior art arrangement is that the closed ball check never stays completely closed; it moves away from its seat and permits leakage, thus preventing accurate flow regulation. These and other drawbacks of the previously-known devices have been obviated by the present invention in a novel manner.

It is therefore an outstanding object of the invention to provide a valve having different and adjustable flow-restriction characteristics in two directions.

Another object of this invention is the provision of a flow control valve having two adjustable restrictions and means for rendering one restriction only operative upon reversal of flow.

A still further object of the invention is the provision of a flow control valve having two checks and two restrictions, in which the conditions of operation of these elements are instantly reversed without leakage upon reversal of flow.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 2:
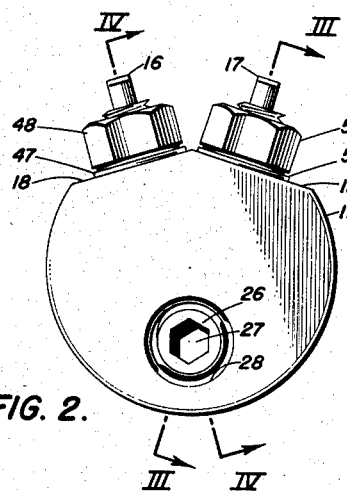
Figure 1:
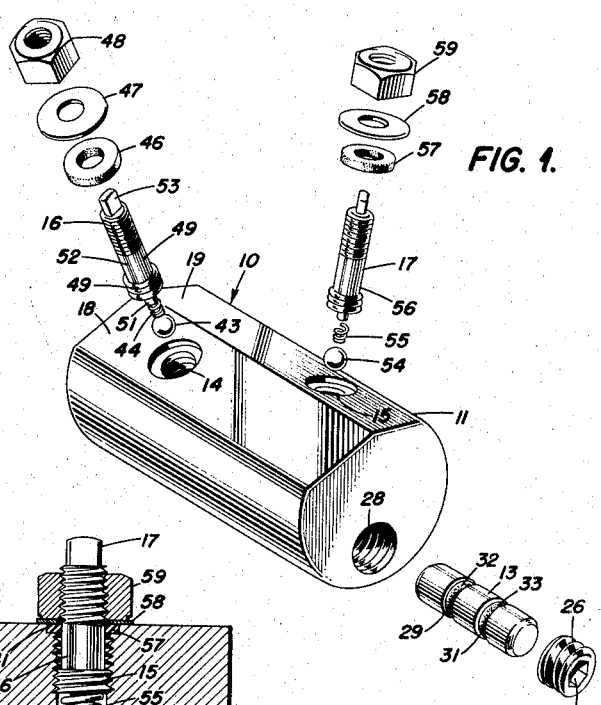
Figure 4:
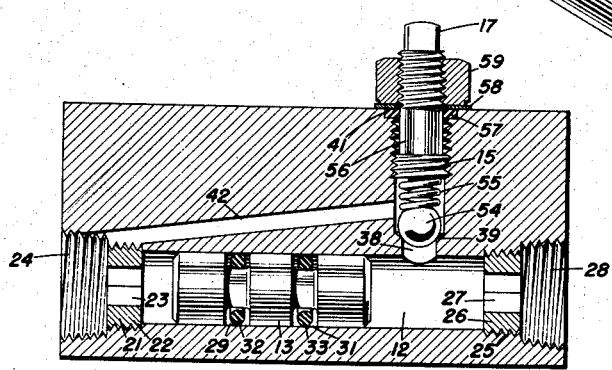
Figure 3:
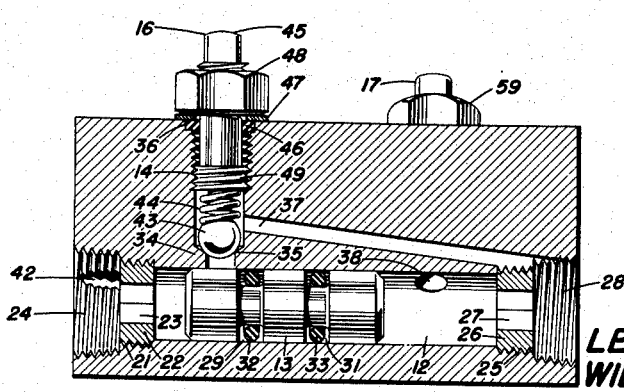

In said annexed drawings:

Figure 1 is an exploded perspective view of a valve embodying the principles of the invention, Figure 2 is an end view of the valve, Figure 3 is a longitudinal sectional view of the invention taken on the line III—III of Figure 2, and Figure 4 is a longitudinal sectional view of the invention taken on the line IV—IV of Figure 2.

For the purposes of the description which follows, the expression "longitudinal" is used to indicate the general direction of flow of fluid through the valve, while the word "transverse" and the like is used to denote a direction at a right angle thereto.

Referring first to Figure 1, wherein is best shown the general features of the invention, the valve, indicated generally by the reference numeral 10, is shown as consisting of a body 11 having a longitudinal bore 12 in which is slidably received a piston 13. Two transverse bores 14 and 15 are formed in the body and receive valve assemblies 16 and 17, respectively.

In Figure 2 it is evident that the body 11 is of a generally cylindrical conformation, with the exception of flat portions 18 and 19 on which the bores 14 and 15, respectively, open. The centerlines of the bores 14 and 15 are directed toward the centerline of the bore 12 and they lie at an angle of around 45 degrees to each other.

Referring to Figures 3 and 4, which show sections through the bores 14 and 15, respectively, it can be seen that the bore 12 is of a diameter to provide a slide fit with the piston 13. At one end, the bore is provided with a threaded counterbore 21 into which is threaded a stop member 22 having a hexagonal passage 23 therethrough; at this same end the bore is formed with a standard pipe thread section 24. At the other end, the bore has a threaded counterbore 25 in which is threaded a stop member 26 having a hexagonal passage 27 passing through the center thereof; at this end the bore is formed with a threaded portion 28. The threaded portions 24 and 28 are formed to permit the connection of hydraulic lines to the valve. The piston 13 is provided with grooves 29 and 31 in which reside rubber O-rings 32 and 33, respectively. The bore 14 is situated adjacent the stop member 22, while the bore 15 is located adjacent the stop member 26. The bore 14 is threaded throughout its upper portion and its diameter is reduced in the lower portion 34 to form a beveled shoulder 35; an annular groove 36 surrounds the upper edge of the bore. From the larger, upper portion of the bore in the unthreaded portion just above the shoulder 35 extends an inclined passage 37 which terminates in the counterbore 25 and the threaded portion 28. In the same way, the bore 15 has a reduced lower portion 38 defining a beveled shoulder 39, an annular groove 41 at the upper end, and it is threaded throughout its upper portion. A passage 42 leads from the bore above the shoulder 39 to the bore 12 at the counterbore 21 and the threaded portion 24.

Within the bore 14 lies the valve assembly 16, consisting of a ball 43, a coil spring 44, a stem 45, an annular rubber gasket 46, a washer 47, and a nut 48. The stem 45 has threaded portion 49 which is threaded into the upper portion of the bore 14 and a reduced lower portion 51; the upper portion 52 is not threaded and has an upper portion 53 formed to receive a wrench. The ball 43 resides between the lower portion 53 of the stem and the shoulder 34; the spring 44 biases the ball into contact with the shoulder. The gasket 46 lies in the groove 36; the washer 47 and the nut 48 overlie the gasket and deform it into sealing contact with the unthreaded upper portion of the stem. In the same manner, the bore 15 receives the assembly 17 consisting of a ball 54, a coil spring 55, a stem 56, a gasket 57, a washer 58, and a nut 59.

The operation of the invention will be readily understood in view of the above discussion. When the valve 10 is placed in a hydraulic system, hydraulic lines or pipes are fastened in the threaded portions 24 and 28; fluid flow takes place through the valve from one pipe to the other. For instance, if the valve is placed in a line leading to one end of a hydraulic cylinder, it will be used to control the flow of fluid at different rates to and from the cylinder; when flow is toward the cylinder, high pressure fluid will appear at one end of the valve, say at the portion 24, while pressure will appear at the other end, say at the portion 28, when the flow is away from the cylinder. When pressure fluid appears at the portion 24, the piston 13 travels along the bore 12 until it strikes the stop member 26; in this extreme position, the reduced portion 38 of the bore 15 is covered and the ball 54 is pressed into contact with the shoulder 39. Although fluid fills the passage 42 and the space in the bore 15 above the ball, no flow takes place therethrough. At the same time, the reduced portion 34 of the bore 14 is open to fluid flow and pressure which enters the valve through the threaded portion 24 and the aperture 23 in the stop member 22. The ball 43 is pushed upwardly against the pressure of the spring 44 until it rests against the end of the reduced portion 51 of the stem 45. Flow takes place through the space between the ball and shoulder and through the passage 37 into the pipe threaded in the portion 28. The amount of fluid passing in this way is regulated by the space between the shoulder 35 and the ball 43 and this, in turn, is determined by the distance that the stem 45 is threaded into the bore 14. This distance can, of course, be adjusted by rotating the stem, making use of the wrench-engageable portion 53.

When the flow of fluid is reversed and pressure is felt at the end of the valve occupied by the portion 28, the ball 43 is immediately thrown into contact with the shoulder 35 and a short time later, the piston 13 arrives at the stop member 22 and shuts off the reduced portion 34 of the bore 14. On the other hand the ball 54 is lifted from the shoulder 39 and is brought into contact with the bottom of the stem 56 and fluid flow takes place through the passage 42 into the pipe attached to the threaded portion 24.

It is important in some hydraulic installations that, upon reversal of flow, an accurate restriction be thrown into the line immediately and that no leakage take place through any checks. In the present case, immediate exchange of one restriction for the other upon flow reversal takes place very quickly because of the low inertia of the balls; complete sealing against leakage through the supposedly inoperative restriction is accomplished by means of the piston 13, although its action is not as rapid due to its greater inertia. In other words, the present construction permits the rapid checking action of a low inertia device with the complete sealing available with a high inertia device.

Other modes of applying the principles of the invention may be employed, change being made as regards the details described, provided the features stated in the following claim, or the equivalent of such, be employed.

The invention having been thus described, what is claimed as new and desired to secure by Letters Patent is:

1. A valve comprising a body having a main bore extending completely through the body, two secondary bores extending into the body and intersecting the main bore, the axis of each secondary bore forming a plane with the axis of the main bore, the secondary axes being so arranged that the planes so formed are angularly disposed to each other, a piston slidable in the main bore between stop means determining extreme positions at each of which it covers the opening of one of the secondary bores into the main bore, a valve assembly residing in each of the secondary bores, a passage extending through the body from each of the secondary bores on the opposite side of the valve assembly from said main bore to that end of the main bore which is fathest from its associated secondary bore and at a point nearer the end of the main bore than the extreme position of the piston when the piston is at that end of the bore.

2. A valve comprising an elongated body having a main bore extending completely through the body, two secondary bores extending into the body and intersecting the main bore, the axis of each secondary bore forming a plane with the axis of the main bore, the secondary axes being so arranged that the planes so formed are angularly disposed to each other, a piston slidable in the main bore between stop means determining extreme positions at each of which it covers the opening of one of the secondary bores into the main bore, an adjustable restriction residing in each of the secondary bores, a passage extending through the body from a point in each of the secondary bores on the opposite side of the restriction from the main bore to that end of the main bore which is farthest from its associated secondary bore and at a point nearer the end of the main bore than the extreme position of the piston when the piston is at that end of the bore.

3. A valve comprising a body having a main bore extending completely through the body, two secondary bores extending into the body and having a portion of reduced diameter which intersects the main bore, the axis of each secondary bore forming a plane with the axis of the main bore, the secondary axes being so arranged that the planes so formed are angularly disposed to each other, a piston slidable in the main bore between stop means determining extreme positions at each of which it covers the opening of one of the secondary bores into the main bore, a valve assembly residing in each of the secondary bores, the assembly including a ball which lies against the portion of the bore of reduced diameter and a stem which is threadedly mounted in the bore and determines the distance that the ball can move away from the portion of reduced diameter, a passage extending through the body from each of the secondary bores on the opposite side of the valve assembly from said main bore to that end of the main bore which is farthest from its secondary bore and at a point nearer the end of the main bore than the extreme position of the piston when the piston is at that end of the bore.

4. A valve comprising an elongated body having a main bore extending completely through the body, two secondary bores extending into the body, each secondary bore having a reduced portion which intersects the main bore and an enlarged portion extending to the exterior of the body, the reduced portions intersecting the main bore, the axis of each secondary bore forming a plane with the axis of the main bore, the secondary bores being so arranged that the planes so formed are angularly disposed to each other, a shoulder situated at the junction of the two portions, intersecting the main bore, a piston slidable in the main bore between stop means determining extreme positions at each of which it covers the opening of one of the secondary bores into the main bore, a valve assembly residing in each of the secondary bores, the assembly including a ball which is pressed by a spring against the shoulder of the portion of the bore of reduced diameter and a stem which is threadedly mounted in the enlarged portion of the bore and determines the distance the ball can move away from the shoulder, a passage extending through the body from a point in the enlarged portion of each of the secondary bores to that end of the main bore which is farthest from its associated secondary bore and at a point nearer the end of the main bore than the extreme position of the piston when the piston is at that end of the bore.

5. A valve comprising a body having a main bore extending completely through the body, two secondary bores extending into the body and intersecting the main bore, the axis of each secondary bore forming a plane with the axis of the main bore, the secondary axes being so arranged that the planes so formed are angularly disposed to each other, a piston slidable in the main bore between stop means determining extreme positions at each of which it covers the opening of one of the secondary bores into the main bore, a valve assembly residing in each of the secondary bores, a passage extending through the body from each of the secondary bores on the opposite side of the valve assembly from the main bore to that end of the main bore which is farthest from its associated secondary bore.

6. A valve comprising a body having a main bore extending completely through the body, two secondary bores extending into the body and intersecting the main bore, the axis of each secondary bore forming a plane with the axis of the main bore, the secondary axes being so arranged that the planes so formed are angularly disposed to each other, a piston slidable in the main bore between stop means determining extreme positions at each of which it covers the opening of one of the secondary bores into the main bore, a piston having circumferential grooves in each of which resides a resilient O-ring, a valve assembly residing in each of the secondary bores, a passage extending through the body from each of the secondary bores on the opposite side of the valve assembly from the main bore to that end of the main bore which is farthest from its associated secondary bore, said stop means comprising a stop member at each end of the bore in position to determine the extreme position of the piston, the stop member having an aperture therethrough.

References Cited in the file of this patent

UNITED STATES PATENTS

| | | |
|---|---|---|
| 633,707 | Swartz | Sept. 28, 1899 |
| 2,595,389 | Kinnaird | May 6, 1952 |
| 2,664,101 | Betancourt Cano et al. | Dec. 29, 1953 |
| 2,721,575 | Gier | Oct. 25, 1955 |